United States Patent
Yerrabommanahalli et al.

(10) Patent No.: US 10,327,196 B2
(45) Date of Patent: Jun. 18, 2019

(54) APPARATUS AND METHODS FOR INTELLIGENT SCHEDULING IN HYBRID NETWORKS BASED ON CLIENT IDENTITY

(71) Applicant: Apple Inc., Cupertino, CA (US)

(72) Inventors: Vikram B. Yerrabommanahalli, Cupertino, CA (US); Prashant H. Vashi, Cupertino, CA (US); Jianxiong Shi, Cupertino, CA (US); Sreevalsan Vallath, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 13/859,657

(22) Filed: Apr. 9, 2013

(65) Prior Publication Data

US 2013/0294417 A1    Nov. 7, 2013

Related U.S. Application Data

(60) Provisional application No. 61/621,935, filed on Apr. 9, 2012.

(51) Int. Cl.
*H04W 40/24*    (2009.01)
*H04W 48/18*    (2009.01)
*H04W 88/06*    (2009.01)

(52) U.S. Cl.
CPC ........... *H04W 40/24* (2013.01); *H04W 48/18* (2013.01); *H04W 88/06* (2013.01)

(58) Field of Classification Search
CPC ...... H04W 36/16; H04W 74/04; H04W 40/24
See application file for complete search history.

(56) References Cited

U.S. PATENT DOCUMENTS

| 6,643,513 | B2 * | 11/2003 | Timonen | H04W 36/0038 |
| | | | | 380/247 |
| 7,860,502 | B2 * | 12/2010 | Kim | H04B 1/7105 |
| | | | | 370/310 |
| 7,936,880 | B2 * | 5/2011 | Huang | H04W 12/04 |
| | | | | 380/272 |
| 8,081,604 | B2 * | 12/2011 | Wu | H04W 36/14 |
| | | | | 370/331 |

(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Document No. 36.300; published Dec. 2011.*

(Continued)

*Primary Examiner* — Andrew Lai
*Assistant Examiner* — Hoyet H Andrews
(74) *Attorney, Agent, or Firm* — Dickinson Wright RLLP

(57) ABSTRACT

Methods and apparatus for intelligent scheduling in hybrid networks based on client identity. For example, in one embodiment, the hybrid networks are cellular networks (e.g., LTE and CDMA 1X), and a cellular device uses a single-radio solution to support circuit-switched calls on a CDMA 1X network and packet-switched calls on LTE. Periodically, the cellular device tunes away from LTE and monitors CDMA 1X activity, and vice versa. The LTE network can infer the cellular device's tune away schedule, based on the device's identity, and the paging schedule algorithm of the CDMA 1X network.

20 Claims, 5 Drawing Sheets

(56) References Cited

U.S. PATENT DOCUMENTS

| | | | | |
|---|---|---|---|---|
| 8,279,837 B2* | 10/2012 | Qiu | ............... | H04W 36/0055 370/331 |
| 8,413,209 B2* | 4/2013 | Aldera | ............... | H04L 63/102 713/185 |
| 8,600,390 B2* | 12/2013 | Vikberg | ............... | H04W 36/0066 455/436 |
| 8,768,290 B2* | 7/2014 | Tiwari | ............... | H04W 48/16 455/404.1 |
| 8,811,935 B2* | 8/2014 | Faccin | ............... | H04W 48/18 455/404.1 |
| 8,817,744 B2* | 8/2014 | Rexhepi | ............... | H04W 36/0022 370/328 |
| 8,954,077 B2* | 2/2015 | Horn | ............... | H04W 36/08 370/331 |
| 9,002,356 B2* | 4/2015 | Horn | ............... | H04W 36/08 370/331 |
| 9,002,361 B2* | 4/2015 | Bergquist | ............... | H04W 12/08 370/331 |
| 9,066,268 B2* | 6/2015 | Huang | ............... | H04W 36/0055 |
| 9,131,415 B2* | 9/2015 | Scott | ............... | H04L 29/06027 |
| 9,131,427 B2* | 9/2015 | Wu | ............... | H04L 63/104 |
| 9,301,203 B2* | 3/2016 | Sayeedi | ............... | H04W 28/12 |
| 9,445,310 B2* | 9/2016 | Aoyagi | ............... | H04W 36/0005 |
| 9,445,333 B2* | 9/2016 | Guo | ............... | H04W 36/18 |
| 9,462,513 B2* | 10/2016 | Centonza | ............... | H04W 36/24 |
| 9,985,967 B2* | 5/2018 | Salmela | ............... | H04W 12/04 |
| 2002/0126641 A1* | 9/2002 | Bender | ............... | H04W 36/16 370/337 |
| 2004/0137900 A1* | 7/2004 | Varonen | ............... | H04W 4/02 455/433 |
| 2004/0137918 A1* | 7/2004 | Varonen | ............... | H04W 8/10 455/456.2 |
| 2004/0165563 A1* | 8/2004 | Hsu | ............... | H04W 48/18 370/338 |
| 2004/0176024 A1* | 9/2004 | Hsu | ............... | H04L 12/189 455/3.04 |
| 2004/0205158 A1* | 10/2004 | Hsu | ............... | H04W 48/18 709/218 |
| 2005/0113069 A1* | 5/2005 | Knauerhase | ............... | G06F 21/43 455/411 |
| 2005/0245253 A1* | 11/2005 | Khushu | ............... | G01S 19/24 455/423 |
| 2006/0045267 A1* | 3/2006 | Moore | ............... | H04L 63/061 380/247 |
| 2006/0143444 A1* | 6/2006 | Malkamaki | ............... | H04L 1/0083 713/160 |
| 2006/0205434 A1* | 9/2006 | Tom | ............... | H04W 8/26 455/558 |
| 2007/0072643 A1* | 3/2007 | Jiang | ............... | H04W 36/0083 455/560 |
| 2007/0099614 A1* | 5/2007 | Parekh | ............... | H04W 36/0083 455/436 |
| 2007/0293224 A1* | 12/2007 | Wang | ............... | H04W 36/0055 455/436 |
| 2008/0219241 A1* | 9/2008 | Leinonen | ............... | H04L 29/12594 370/352 |
| 2008/0316972 A1* | 12/2008 | Shaheen | ............... | H04W 36/0033 370/331 |
| 2009/0005042 A1* | 1/2009 | Bi | ............... | H04W 48/10 455/436 |
| 2009/0042576 A1* | 2/2009 | Mukherjee | ............... | H04J 11/0093 455/436 |
| 2009/0141689 A1* | 6/2009 | Parekh | ............... | H04W 68/12 370/332 |
| 2009/0225719 A1* | 9/2009 | Zhi | ............... | H04W 72/12 370/329 |
| 2009/0316656 A1* | 12/2009 | Zhao | ............... | H04W 28/22 370/331 |
| 2010/0046476 A1* | 2/2010 | Qiu | ............... | H04W 36/02 370/331 |
| 2010/0240400 A1* | 9/2010 | Choi | ............... | H04W 68/02 455/458 |
| 2010/0278132 A1* | 11/2010 | Palanki | ............... | H04B 1/7107 370/329 |
| 2010/0279695 A1* | 11/2010 | Amirijoo | ............... | H04W 36/0055 455/438 |
| 2010/0284333 A1* | 11/2010 | Shirota | ............... | H04W 36/0022 370/328 |
| 2010/0323696 A1* | 12/2010 | Cherian | ............... | H04W 60/005 455/435.2 |
| 2011/0255412 A1* | 10/2011 | Ngai | ............... | H04W 48/16 370/241 |
| 2011/0280221 A1* | 11/2011 | Chin | ............... | H04W 76/048 370/335 |
| 2011/0317635 A1* | 12/2011 | Swaminathan | ... | H04W 36/0088 370/329 |
| 2012/0040662 A1* | 2/2012 | Rahman | ............... | H04W 36/0055 455/423 |
| 2012/0099428 A1* | 4/2012 | Kamdar | ............... | H04L 41/5022 370/235 |
| 2012/0149325 A1* | 6/2012 | Titus | ............... | H04W 4/90 455/404.2 |
| 2012/0170453 A1* | 7/2012 | Tiwari | ............... | 370/230 |
| 2012/0196603 A1* | 8/2012 | Mochizuki | ............... | H04W 48/02 455/436 |
| 2012/0236713 A1* | 9/2012 | Kakadia | ............... | H04L 41/5025 370/230 |
| 2012/0315914 A1* | 12/2012 | Zhang | ............... | H04B 7/155 455/439 |
| 2013/0064175 A1* | 3/2013 | Pandey et al. | ............... | 370/328 |

OTHER PUBLICATIONS

3rd Generation Partnership Project 2; Interoperability Specification (IOS) for cdma2000 Access Network Interfaces—Part 3 Features; Document No. 3GPP2 A.S0013-C v3.0; published Sep. 2010.*

Wi-Fi Alliance Technical Committee P2P Task Group Wi-Fi Peer-to-Peer (P2P) Technical Specification Version 1.1) release Oct. 4, 2010.*

* cited by examiner

APPARATUS AND METHODS FOR INTELLIGENT SCHEDULING IN HYBRID NETWORKS BASED ON CLIENT IDENTITY

PRIORITY AND RELATED APPLICATIONS

This application claims priority to co-owned U.S. Provisional Application Ser. No. 61/621,935 of the same title filed Apr. 9, 2012, which is incorporated herein by reference in its entirety.

This application is related to co-owned U.S. Provisional Patent Application Ser. Nos. 61/599,320 filed on Feb. 15, 2012, and entitled "APPARATUS AND METHODS FOR CLIENT SERVER INTERACTION IN HYBRID NETWORK ENVIRONMENTS", 61/599,325 filed on Feb. 15, 2012, and entitled "APPARATUS AND METHODS FOR OPTIMIZING SCHEDULED OPERATIONS IN HYBRID NETWORK ENVIRONMENTS", 61/598,815 filed Feb. 14, 2012, and entitled "APPARATUS AND METHODS FOR NETWORK ASSISTED HYBRID NETWORK OPERATION", 61/598,818 filed Feb. 14, 2012, and entitled "APPARATUS AND METHODS FOR CLIENT SERVER INTERACTION IN HYBRID NETWORK ENVIRONMENTS", 61/598,824 filed Feb. 14, 2012, and entitled "APPARATUS AND METHODS FOR OPTIMIZING SCHEDULED OPERATIONS IN HYBRID NETWORK ENVIRONMENTS", 61/488,620 filed May 20, 2011, and entitled "APPARATUS AND METHODS FOR NETWORK ASSISTED HYBRID NETWORK OPERATION", 61/488,649 filed. May 20, 2011, and entitled "APPARATUS AND METHODS FOR CLIENT SERVER INTERACTION IN HYBRID NETWORK ENVIRONMENTS", 61/488,663 filed May 20, 2011, and entitled "APPARATUS AND METHODS FOR OPTIMIZING SCHEDULED OPERATIONS IN HYBRID NETWORK ENVIRONMENTS", 61/478,922 filed Apr. 25, 2011, and entitled "DUAL NETWORK MOBILE DEVICE RADIO RESOURCE MANAGEMENT", 13/099,204 filed May 2, 2011, and entitled "SINGLE-RADIO DEVICE SUPPORTING COEXISTENCE BETWEEN MULTIPLE RADIO ACCESS TECHNOLOGIES", 61/472,617 filed Apr. 6, 2011, and entitled "MULTIPLE NETWORK MOBILE DEVICE CONNECTION MANAGEMENT", 61/433,160 filed Jan. 14, 2011, and entitled "DYNAMIC LOADING IN DEVICES WITH MULTIPLE ANTENNAS", and 61/433,162 filed Jan. 14, 2011, and entitled "MULTIMODE USER EQUIPMENT WITH DUAL CIRCUIT ARCHITECTURE", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to operation within heterogeneous wireless systems such as, for example, hybrid network operation in which client devices can communicate using several networks. More particularly, in one exemplary regard, the methods and apparatus for intelligent scheduling in hybrid networks based on client identity are disclosed.

2. Description of Related Technology

A wireless (e.g., cellular) network operator provides mobile telecommunications services to the public via a network infrastructure of e.g., cellular base stations (BS), base station controllers, infrastructure nodes, etc. There is a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more wireless networks. Multimode operation allows a device to operate on any one of several network technologies, but does not enable operation on multiple network technologies simultaneously.

For example, in the last few years, Long Term Evolution (LTE) has become the dominant choice for Fourth Generation (4G) cellular network technologies. LTE is standardized under the Third Generation Partnership Project (3GPP); existing LTE networks comply with so-called Release 8 requirements, incipient research is directed to future enhancements for subsequent releases (e.g., Release 9, Release 10, etc.). Code Division Multiple Access 2000 (CDMA2000) cellular technologies are standardized under the Third Generation Partnership Project Two (3GPP2). While LTE enables significant improvements for data services, existing LTE networks do not provide adequate support for voice services; thus, 3GPP2 network operators that have deployed CDMA2000 networks will continue to use CDMA2000 for voice services, while additionally supporting LTE networks for high speed data services.

Incipient research is also directed to so-called "hybrid" network operation. During hybrid network operation, the client device can operate simultaneously among multiple distinct networks having different technologies. In one exemplary case, a hybrid device can support both: (i) Long Term Evolution (LTE) and (ii) Code Division Multiple Access 1X (CDMA 1X) networks; i.e., the device can maintain a simultaneous connection between a first LTE network and a second CDMA 1X network. For example, a LTE/CDMA 1X hybrid device can conduct a voice call over the CDMA 1X network while the mobile device is in LTE mode. In another exemplary case, a hybrid device can support both: (i) CDMA 1X-EVDO (Evolution Data Optimized) and (ii) CDMA 1X networks.

Existing solutions for hybrid network operation rely on the client device to manage its own operation between networks. Specifically, the client device is responsible for maintaining its active connections to the various service networks; there are no required changes to existing network installations (i.e., hybrid network operation does not affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid operation are also capable of normal operation.

However, since existing solutions for hybrid network operation do not require the constituent networks to coordinate with one another, the client device will inevitably experience certain scheduling collisions. For example, while a mobile device is attached to a first LTE network, it must periodically "tune out" or "tune away" from the LTE network to perform CDMA 1X actions (such as decoding the Quick Paging Channel (QPCH) to determine if the device is being paged). If the mobile device is receiving data from the LTE network during the tune out period, this data is lost. For example, during the time when the device has to perform a 1x tune away, the device might be RRC connected in LTE, and left with no mechanism by which the device can notify the LTE network that it is tuning away. This has adverse impacts to network capacity, because inter alia the LTE network can continue to schedule the device for various operations, not knowing that it has tuned away to, e.g., 1x for monitoring the page.

Moreover, when the device tunes back to LTE, the device may continue to assume that it is still in the RRC connected state in LTE; however, the LTE network might have transitioned the device to RRC idle (because the network did not receive any acknowledgements for the transmissions it sent to the device when the device was tuned away).

Accordingly, improved apparatus and methods for addressing such uncoordinated (or loosely coordinated) hybrid interface operation are needed.

SUMMARY

The aforementioned needs are satisfied herein by providing, inter alia, improved apparatus and methods for intelligent scheduling in hybrid networks based on client identity.

Firstly, a method for intelligent scheduling based on client identity is disclosed. In one embodiment, the method is applied to a client device operating within two or more hybrid networks, and includes: identifying a client device; calculating one or more scheduled tune away events associated with the identified client device; during the one or more scheduled tune away events, suspending the client device; and otherwise servicing the client device normally.

In another embodiment, the method includes: identifying a client device; determining one or more tune-away events associated with the identified client device; during the one or more tune-away events, suspending at least one aspect of the operation of the client device interaction with the host wireless network; and otherwise servicing the client device normally.

An apparatus for intelligent scheduling in hybrid networks based on client identity is also disclosed. In one embodiment, the apparatus is a network-based entity (e.g., server). In one variant, the network apparatus includes: a processor; a wireless interface in data communication with the processor; and a storage device in data communication with the processor, the storage device comprising at least one computer program. The at least one program is configured to, when executed, cause the network apparatus to: receive information identifying a client device that is in communication with the apparatus via the wireless interface; based at least in part on the received information, identify at least one other wireless network with which the client device can operate; based at least in part on the identified at least one other wireless network, determine at least one scheduled tune-away event to be conducted by the client device; and during the at least one tune-away event, modify the operation of at least one of (i) the client device relative to the network apparatus, and/or (ii) the network apparatus relative to the client device.

In another embodiment, the apparatus is a mobile device such as a smartphone or tablet computer.

A computer-readable storage apparatus is further disclosed. In one embodiment, the apparatus includes a storage medium having at least one computer program stored thereon, the at least one program being configured to, when executed, identify a client device; calculate one or more scheduled tune away events associated with the identified client device; during the one or more scheduled tune away events, suspend the client device; and otherwise service the client device normally.

In another embodiment, the computer readable apparatus includes computerized logic, the logic configured to cause a host device of the apparatus to: receive information enabling identification a client device that is in communication with the host device via a wireless interface thereof; based at least in part on the received information, identify at least one other wireless technology which the client device can utilize; based at least in part on the identified at least one other wireless network, determine at least one tune-away event to be conducted by the client device at a future time; and during the at least one tune-away event, suspend at least one aspect of operation between the client device and the host device so as to reduce wasting of resources.

A hybrid network system is also disclosed. In one embodiment, the system includes at least two networks, and at least one network of the hybrid network system intelligent schedules its data transactions with deference to the other network based on the client device.

A client device capable of hybrid network operation is additionally disclosed.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features and advantages will immediately be recognized by persons of ordinary skill in the art with reference to the attached drawings and detailed description of exemplary embodiments as given below.

All Figures © Copyright 2012-2013 Apple Inc. All rights reserved.

DETAILED DESCRIPTION

Reference is now made to the drawings, wherein like numerals refer to like parts throughout.
Detailed Description of Exemplary Embodiments Exemplary embodiments of various features of the present disclosure are now described in detail. While these embodiments and features are primarily discussed in the context of Long Term Evolution (LTE), Code Division Multiple Access 1X (CDMA 1X) cellular networks, and CDMA 1X EVDO (Evolution Data Optimized), it will be recognized by those of ordinary skill that the present disclosure is not so limited, and can be used with other cellular technologies such as TD-LTE (Time-Division Long-Term Evolution), TD-LTE-Advanced, TD-SCDMA (Time Division Synchronous Code Division Multiple Access) and Global System for Mobile Communications (GSM). In fact, the various features of the disclosure are useful in combination with any network (cellular, wireless, wireline, or otherwise) that can benefit from intelligent scheduling based on client identity.

LTE/CDMA 1X Hybrid Network Operation—

Figure 1:
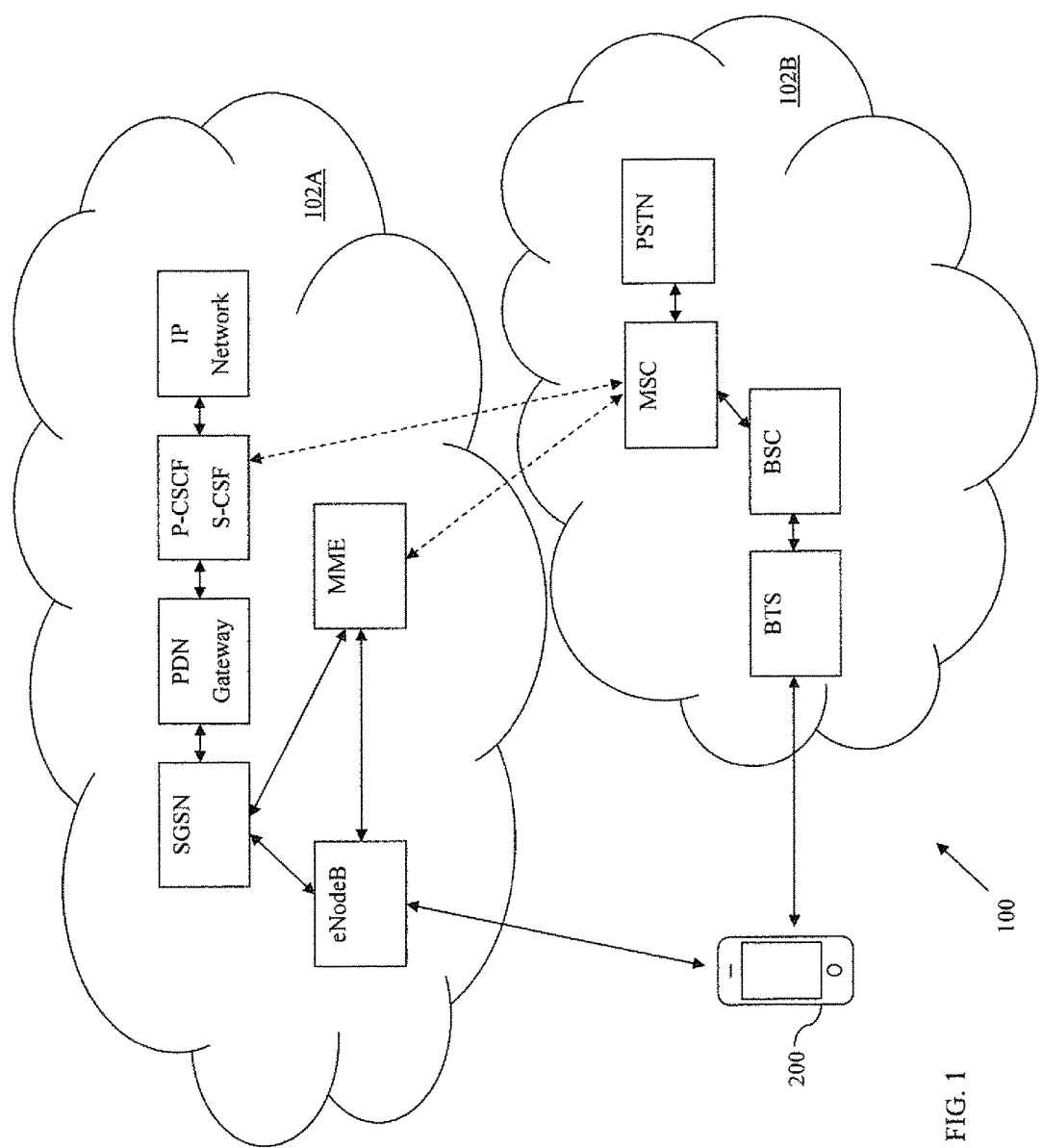
FIG. 1 is a logical block diagram illustrating one exemplary hybrid network system useful in conjunction with various features of the present disclosure.

Hybrid networks are composed of multiple radio access networks (RANs) which are coupled in varying degrees to provide service to a population of devices. There may be varying degrees of coordination between networks. For example, FIG. 1 illustrates an exemplary hybrid network system 100 that includes a first LTE RAN (radio access network) 102A and a second CDMA 1X RAN 102B in communication with a user equipment (UE) client device 200. The degree to which the first LTE RAN, the second CDMA 1X RAN, and the UE are able to coordinate operation is largely determined by how tightly coupled the RANs are. Tightly coupled RANs may share information (e.g., paging information, registration, etc.). Loosely coupled networks may share some information, but remain largely independent. Completely uncoupled networks operate without any coordination whatsoever.

One example of a tightly coupled hybrid networks include networks that support so-called Circuit Switched Fall Back (CSFB) operation. In one exemplary CSFB capable hybrid network, the CDMA 1X RAN coordinates with the LTE RAN for paging message delivery. Specifically, the CDMA 1X RAN can deliver paging messages to the UE via tunneled signaling through the LTE network. If the UE receives a CDMA 1X network page while connected to the LTE network, the UE will "fall back" to the CDMA 1X network. CSFB networks require significant coordination between the CDMA 1X and LTE RANs, thus CSFB is not widely deployed; most CDMA 1X and LTE networks operate independently.

For this reason, significant research has been directed to solutions for uncoupled networks (and/or loosely coupled networks). In uncoupled networks, the client device has a significant burden in managing network operation on multiple networks. Generally, the client device can either maintain multiple active radios (one for each network), or alternately the client device can time multiplex operation for each of the networks. For example, in a dual radio embodiment, a UE simultaneously operates on both networks, using the LTE network for data services and the CDMA 1X network for voice services. The dual radio UE concurrently operates a first CDMA 1X modem and a second LTE modem. Those of ordinary skill in the related arts will recognize that simultaneous operation of both radios consumes a significant amount of power with limited benefits. While dual radio UE operation can transact both data and voice at the same time, concurrent voice and data applications are fairly limited in utility.

Accordingly, in one exemplary embodiment of the present disclosure, a UE implements a time multiplexed scheme for handling the multiple networks. During operation, the device alternates between LTE and CDMA 1X to support both data and voice services. Specifically, the device primarily monitors LTE for data related operations; however, it periodically tunes away to the CDMA 1X network to receive paging messages. In this scheme, the UE can leverage the high data capabilities of the LTE network, while also providing acceptable capabilities for voice services on the CDMA 1X network.

Figure 2:
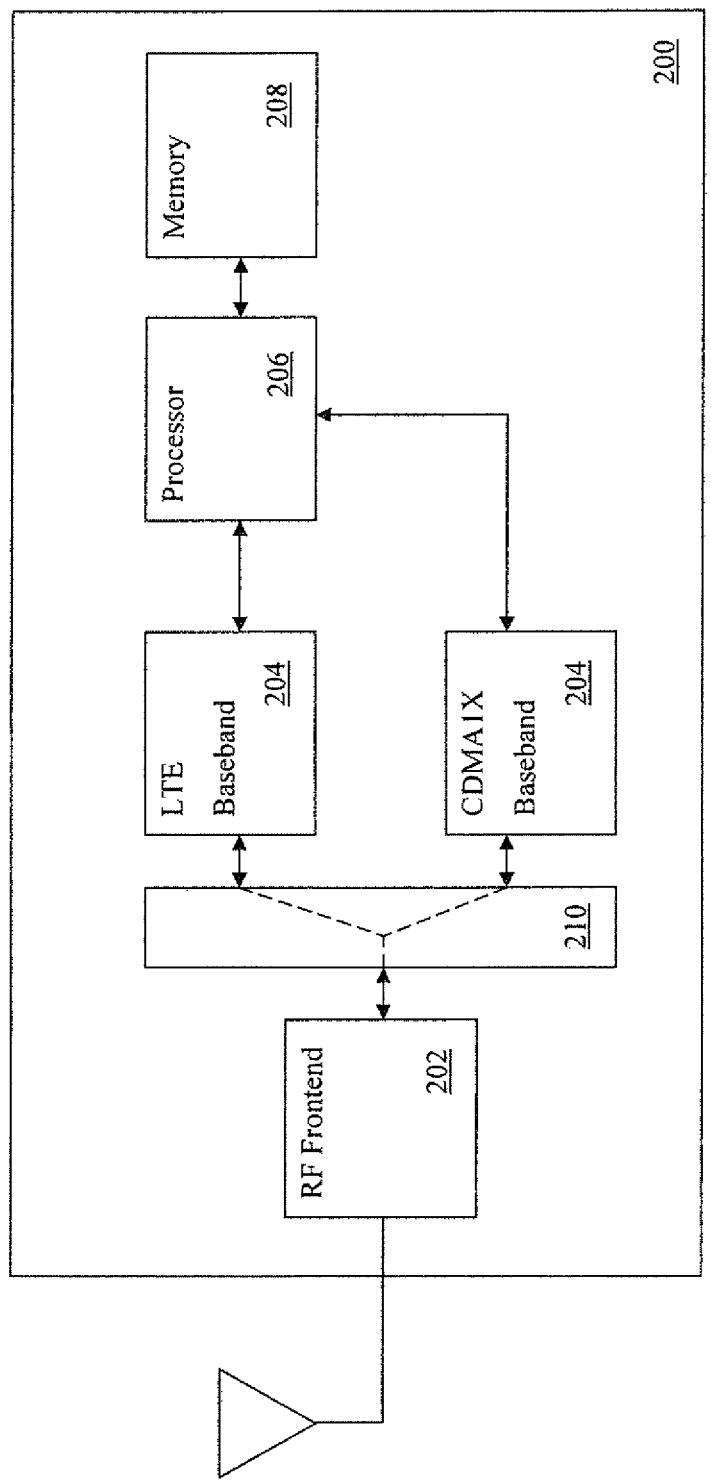
FIG. 2 is a functional block diagram of an exemplary embodiment of a user equipment (UE) apparatus.

Referring now to FIG. 2, the exemplary user equipment (UE) apparatus 200 is illustrated in greater detail. The UE of FIG. 2 is a single-radio solution to support circuit-switched calls on a CDMA 1X network, and packet-switched calls on LTE. Specifically, the UE has a single Radio Frequency (RF) processing "chain" which is used alternately for CDMA 1X or LTE processing (referred to hereinafter as a "single-radio"). The single RF chain periodically tunes away from LTE and monitors CDMA 1X activity, and vice versa. The UE includes: (i) one or more Radio Frequency (RF) front-ends 202 (in some implementations additional RF front-ends may be used for other radio access technologies, etc.), (ii) one or more baseband processors 204, and (iii) at least one application processor 206 and associated memor(ies) 208. In various implementations, the RF front-ends and baseband processors may be further specialized to handle a single wireless technology, or generalized to encompass multiple wireless technologies.

As shown, the exemplary UE includes a first RF front-end that is coupled to both first and second baseband processors adapted to interface to a LTE network and CDMA 1X network, respectively. It is further appreciated that the foregoing configuration is purely illustrative, and various implementations may include other cellular technologies such as GSM, GPRS, EDGE, WCDMA, CDMA2000, CDMA 1X EVDO, LTE-A (LTE Advanced), etc. in various combinations. Moreover, while only a single RF front-end is shown for simplicity, it is appreciated that a RF front-end can (and generally will) include multiple receive and/or transmit antennas and/or chains. For example, well known MIMO (Multiple In Multiple Out), SISO (Single In Single Out), MISO (Multiple In Single Out), and SIMO (Single In Multiple Out) antenna configurations are widely used within the related arts, and may be used consistent with the present disclosure.

Additionally, in one exemplary embodiment, the UE 200 further includes a switching fabric 210 that can connect any one (or more) of the baseband processors 204 to various one (or more) of the antennas 202. The illustrated switching fabric is adapted to connect either the LTE baseband or CDMA 1X baseband to the RF front-end. However, common embodiments may connect one baseband processor to one antenna ("one-to-one"), one-to-many, many-to-one, etc. This "switching" capability is desirable for a number of reasons, including for example: (i) power management, (ii) processing efficiency/flexibility, and (iii) antenna isolation constraints may require that only a subset of radios of a mobile device are active at any one time. In some small form factor designs, there is not enough space to completely isolate multiple antennas during operation; consequently, only one antenna (or a limited subset) can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, etc.).

Moreover, it will be appreciated that other components are commonly incorporated within UE 200, but are not discussed further herein. For example, the UE may include user interface components (display screens, buttons, touch screens such as a multi-touch display, dials, etc.), memory components (e.g., RAM (Random Access Memory), Flash, hard disk drives (HDD), etc.), power management components (e.g., batteries, charger components, etc.), and external interfaces (e.g., Fire Wire™, Universal Serial Bus™ (USB), Thunderbolt™, etc.)

Furthermore, it should be recognized that the UE depicted in FIG. 2 is merely illustrative of one exemplary embodiment. Still other exemplary variants useful with the various features of the present disclosure are described with greater detail in co-owned and co-pending U.S. Provisional Patent Application Ser. Nos. 61/478,922 filed Apr. 25, 2011, and entitled "DUAL NETWORK MOBILE DEVICE RADIO RESOURCE MANAGEMENT", 13/099,204 filed May 2, 2011, and entitled "SINGLE-RADIO DEVICE SUPPORTING COEXISTENCE BETWEEN MULTIPLE RADIO ACCESS TECHNOLOGIES", 61/472,617 filed Apr. 6, 2011, and entitled "MULTIPLE NETWORK MOBILE DEVICE CONNECTION MANAGEMENT", 61/433,160 filed. Jan. 14, 2011, and entitled "DYNAMIC LOADING IN DEVICES WITH MULTIPLE ANTENNAS", and 61/433, 162 filed Jan. 14, 2011, and entitled "MULTIMODE USER EQUIPMENT WITH DUAL CIRCUIT ARCHITECTURE", each of the foregoing being incorporated herein by reference in its entirety.

Hybrid Operation—

The exemplary UE 200 of FIG. 2 is capable of LTE/CDMA 1X hybrid mode operation within, e.g., the hybrid network system of FIG. 1. Specifically, the UE 200 can place CDMA 1X voice calls while registered with the LTE network. During hybrid operation, the UE can be registered to both a LTE network 102A and a CDMA 1X network 102B. The UE is capable of receiving and responding to data and control messaging from either the LTE network or the CDMA 1X network; however, as previously discussed, the UE cannot respond simultaneously to both networks, and always prioritizes CDMA 1X (voice call) traffic over LTE (data) traffic to ensure that user experience for voice calls is unaffected. Other implementations may have other prioritization schemes (e.g., where voice calls are lower priority, based on the type of traffic, historic device usage, etc.)

Once the UE 200 has connected to the LTE network 102A, the UE will periodically "tune" its radio away from the LTE network to perform CDMA 1X maintenance actions such as acquiring a CDMA 1X cell, registering to the acquired CDMA 1X cell, and receiving CDMA 1X pages, etc. Depending on CDMA 1X network 102B radio conditions, these actions can range in one exemplary implementation from eighty milliseconds (80 ms) up to several seconds (4 s-6 s). Moreover, when the UE receives or places a voice call on the CDMA 1X network, the LTE connection may be dropped. As used hereinafter, the terms "tune-away", "tune-out", etc. are interchangeably used, and similarly the reciprocal terms "tune-in", "tune-back", etc. are interchangeably used. More generally, "tune-away" operation is subsumed in a larger group of client device reception outage events. Specifically, these client device reception outage events are typically initiated by the client device (with or without network coordination) to intentionally or indirectly disable reception of the client device to achieve some other purpose or goal. Common examples include e.g., to perform measurements on other networks, to reduce power consumption, to reduce interference on other nearby devices, to preserve processing resources for other applications, etc.

Referring back to the exemplary UE 200 of FIG. 2, there are several events that can trigger a tune-away event. Common examples include (without limitation): (i) registration, (ii) location updates, (iii) paging, (iv) search operations, (v) cell measurements, (vi) voice call events (both mobile originated (MO) (i.e., placed by the mobile device), and mobile terminated (MT) (i.e., received by the mobile device)), (vii) out of service (OOS) procedures, etc. Tune-away events may be periodic in nature (or otherwise predictably scheduled), or may be entirely unpredictable, interrupting events, or variants or combinations thereof. The duration of tune-away events widely varies from a few milliseconds to several seconds. For example, within the exemplary context of CDMA 1X networks, the paging schedule for each mobile device is solely a function of the mobile device's identity. Specifically, the Slot Cycle Index (SCI) that determines the time at which a mobile device is paged is a function of the mobile device's Mobile Identification Number (MIN). In contrast, within LTE networks, the paging schedule may vary widely depending on a number of factors including e.g., a device identifier, recent usage, current operational mode, etc.

As previously noted, the exemplary UE may periodically tune-away from a LTE network to tune-in to the CDMA 1X network to detect a paging channel, and perform serving cell and neighbor cell measurements of the CDMA 1X network. More rarely, the tune-away event may require a substantially longer time interval to perform lengthy maintenance tasks. Common examples of lengthier tasks include, without limitation, Location Area Updates (LAU) where the mobile device must actively exchange information with the CDMA 1X network, periods of poor reception (e.g., the mobile device may need additional time to decode messaging (e.g., paging channels, etc.)), network overhead updates, and/or system parameters changes, etc. Additionally, it is further appreciated, that during voice services (e.g., mobile originated (MO) (voice calls placed by the device), and mobile terminated (MT) calls (voice calls received by the device), etc.), the UE tunes away from the LTE network and handles the voice service via the CDMA 1X network.

Unfortunately, since CDMA 1X and LTE networks are not aware of the other network activity, the device can lose data from the LTE network while tuned into the CDMA 1X network (and vice versa). For example, if the device has an active Radio Resource Connection (RRC) with the LTE network and does not have any scheme for notifying the LTE network that it will tune away, the LTE network will continue to schedule network resources for the device on LTE (without knowing that the device has tuned away). Similarly, when the device tunes back to the LTE network, the device may continue to behave as if it continues to have an RRC connection in the LTE network; however, the LTE network may have transitioned the device to an RRC idle mode because it did not receive any acknowledgments for the transmissions it sent to the device when the device had tuned away.

More generally, those of ordinary skill in the related arts will recognize that many other scenarios can arise where the client device is unable to properly schedule operation between multiple concurrently operating networks.

While the foregoing scenario is discussed in relation to LTE/CDMA 1X capable client devices, it is further appreciated that similar (if not identical) complications arise in other hybrid client devices. For example, other mobile devices may be capable of Time-Division Long-Term Evolution (TD-LTE) and Time Division Synchronous Code Division Multiple Access (TD-SCDMA) technologies. In LTE (also referred to as Frequency Division Duplex LTE (FD-LTE)), the downlink and uplink are transmitted using different frequencies. In Time Division Duplex LTE (TD- LTE), the downlink and the uplink are on the same frequency and the separation occurs in the time domain, so that each direction in a call is assigned to specific timeslots.

Similarly, Time Division Synchronous Code Division Multiple Access (TD-SCDMA) allows traffic to be uplinked (from the mobile terminal to the base station) and downlinked (from the base station to the mobile terminal) using different time slots in the same frame.

Embodiments of the disclosure contemplate the use of these technologies together and separately (in combination with other technologies) in a hybrid network. For example, in an exemplary embodiment relating to both TD-LTE and TD-SCDMA, a UE connected to the TD-LTE network will periodically (or on an event driven or other basis) tune its radio away from the TD-LTE network to perform TD-SCDMA actions such as cell selection, registration, and receiving pages.

Moreover, Global System for Mobile Communications (GSM) is a cellular technology standard that has evolved a number of advancements including General Packet Radio Service (GPRS), Enhanced Data rates for GSM Evolution (EDGE), and Universal Mobile Telecommunications System (UMTS) also known as 3G (Third Generation) UMTS. Various other common embodiments may further combine either LTE, or TD-LTE with any of GSM, GPRS, EDGE, UMTS, etc.

Methods—

Figure 3:
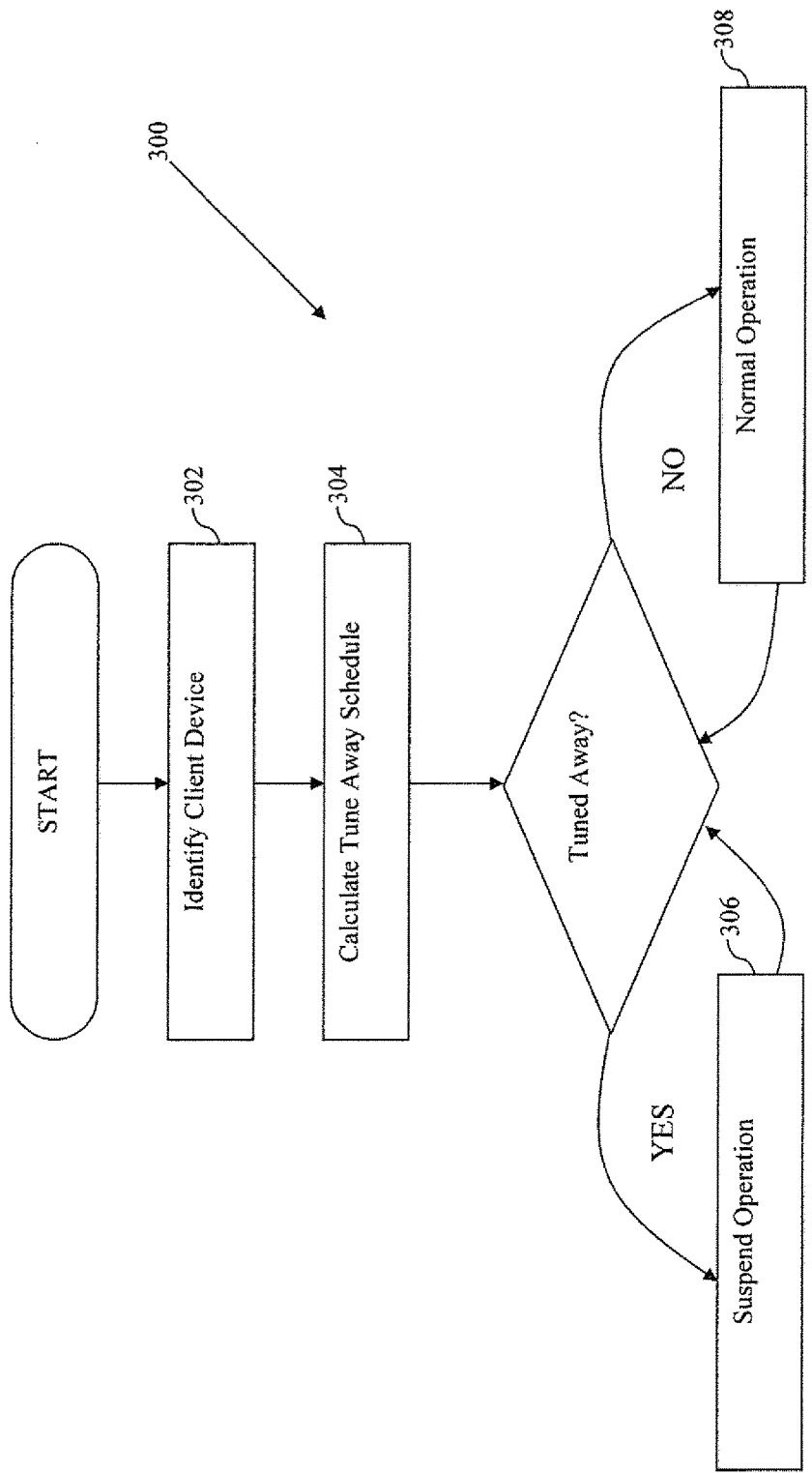
FIG. 3 is a logical flow diagram detailing one embodiment of a generalized method for intelligent scheduling in hybrid networks based on client identity.

Referring now to FIG. 3, one embodiment of a generalized method 300 for intelligent scheduling in hybrid networks based on client identity is illustrated. In one scenario, a client device is connected to a first network, where the first network is entirely unaware of the client device's connections to other network(s). Alternatively, the first network may have limited information on nearby networks (e.g., timing information, registered devices, etc.) which may be periodically refreshed, but is not integrated within the operational decisions for the first network. For example, in one exemplary implementation, a mobile device configured for single-radio operation on a Long Term Evolution (LTE) network and a CDMA 1X network, camps on a LTE network, and periodically tunes to the CDMA 1X network to receive voice calls.

At step 302 of the method 300, the first network identifies the client device. If the client device is a hybrid device operating on multiple disparate networks, then the method proceeds to step 304; otherwise, the device is treated as a single device, and the method can terminate. Identification of the client device includes in one embodiment an identification of one or more other networks. Specifically, the first network identifies one or more other networks which the client device is beholden to for e.g., periodic obligations to measure or monitor access, etc.

In one exemplary embodiment, the client device is identified according to a (human) subscriber or user identity. In one variant, the subscriber or user identity is further associated with a first network identity corresponding to the first network, and at least one or more second network identities associated with one or more second networks.

In other embodiments, the client device is identified according to a device identity. In one variant, the device identity includes one or more unique device identifiers, such as e.g., an Internation Mobile Equipment Identifier, or a MAC address. In other embodiments, the client device is identified according to a device manufacturer, version, etc. (e.g., by class or type of device, irrespective of which particular device of that class or type it is).

In still other embodiments, the client device is identified according to one or more software tokens (e.g., certificates issued by the device manufacturer, etc.).

In one exemplary scenario, a Long Term Evolution (LTE) network identifies one or more voice service networks (such as a CDMA 1X network) associated with a hybrid UE.

At step 304 of the method 300, the first network calculates or determines one or more scheduled tune away events based at least in part on the user/device identification. In one exemplary implementation, the one or more scheduled tune away events are based on a known schedule of the one or more other networks. Known schedules may be periodic, intermittent, event-driven, etc. In one such variant, the schedule is inferred based on the client device's identified characteristics. In other variants, the schedule is explicitly provided by the client device. In still other variants, the schedule may be received via an out-of-band process (e.g., via an external discovery service, etc.), or from a third-party entity such as a network server.

In one implementation, an LTE Mobility :Management Entity (MME) determines, based on a Mobile Identification Number (MIN) associated with a hybrid UE, the UE's corresponding paging schedule in CDMA 1X networks.

During the one or more scheduled tune away events, the first network suspends the state of the client device (step 306). Such suspension may include for example halting and/or storing one or more software contexts associated with the UE. A software context includes for example and without limitation, control data, transaction progress, state information, etc.

In one embodiment, ongoing data transactions and/or new data transactions accrued during the suspension are buffered until the client device resumes operation. Alternatively, data transactions are not buffered, and allowed to lapse. Combinations of the foregoing may also be used, such as where the device (e.g., UE) dynamically switches between buffered/non-buffered schemes based on e.g., one or more operational considerations, and/or selectively applies buffering or non-buffering based on the type of transaction.

In some embodiments, the first network may automatically resume operation after a set period of time. Alternately, the first network may additionally keep the client device suspended until a purge and/or return event. In one such variant, the device triggers the return event based on one or more control signaling messages and/or exchanges. For example, a UE may signal return by sending a channel sounding message, random access attempts, etc.

During resumption, the first network may provide optional control information (e.g., updating the device's state information, etc.). Alternatively, resumption may be performed without further signaling exchanges.

Otherwise, the first network services the client device normally (step 308).

Example Operation—

Figure 4:
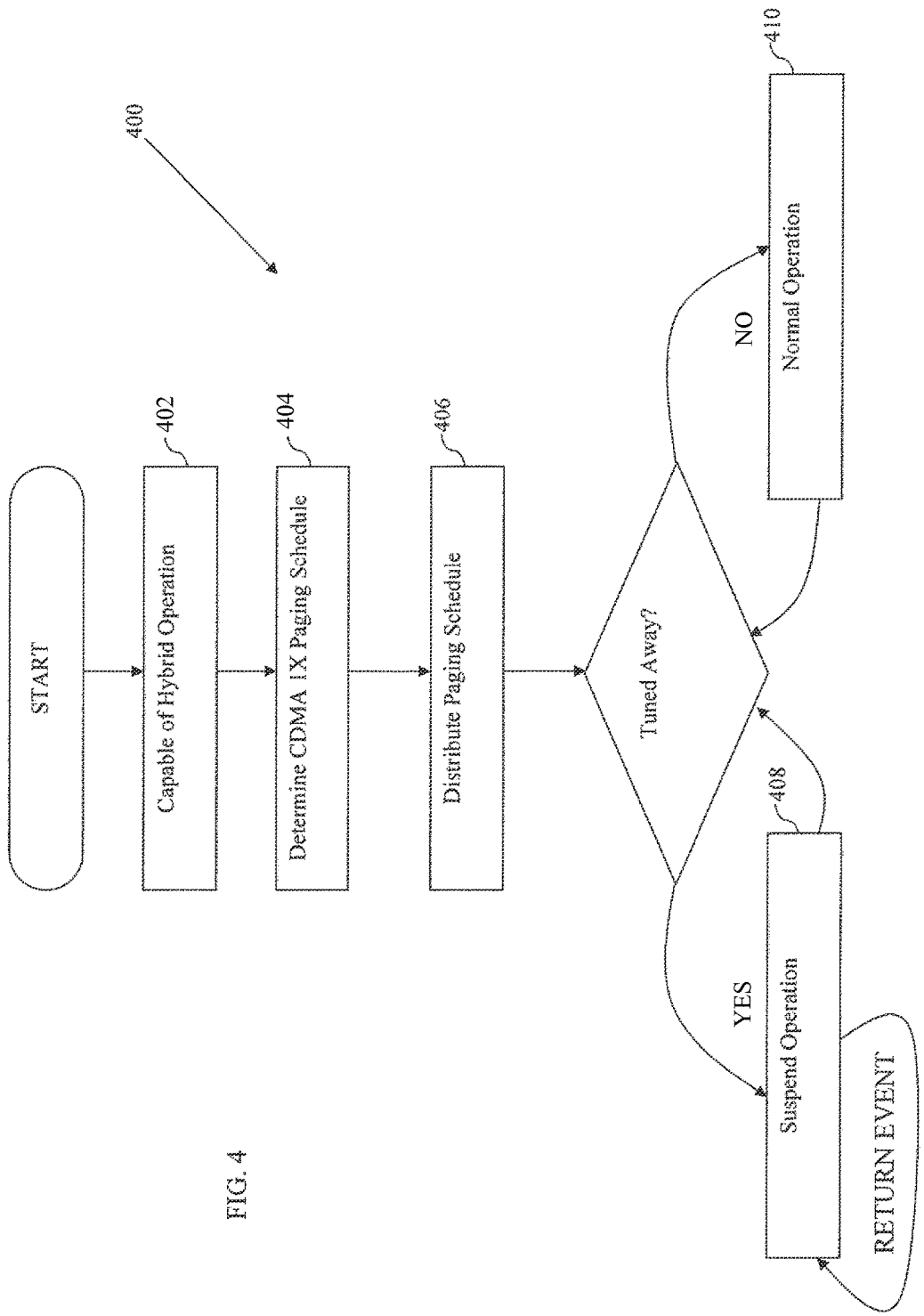
FIG. 4 is a logical flow diagram detailing one exemplary embodiment of a scheme for intelligent scheduling in LTE networks based on client identity within a CDMA 1X network.

Referring now to FIG. 4, one exemplary implementation of the method 300 of FIG. 3 is shown and described. Specifically, one exemplary embodiment of a method 400 for intelligent scheduling in hybrid networks based on client identity is illustrated.

In one scenario, the hybrid client device is a single-radio solution capable of communicating with a Long Term Evolution (LTE) network and Code Division Multiple Access 1X (CDMA 1X) network. While the following operation is described with reference to the evolved Node B (eNB) of the LTE network, it is readily appreciated that various features of the present disclosure are widely applicable to base stations (regardless of technology), and more generally wireless server devices of any type (e.g., ad hoc networks, etc.)

At step 402 of the method 400, responsive to the client device registering to the LTE network, the LTE network determines if the client device is capable of hybrid operation. If the client device is capable of hybrid operation, then the process proceeds to step 404. If the client device is not a hybrid device (e.g., is LTE-capable only), then the process ends.

In one exemplary embodiment, the Home Subscriber Server (HSS) of the LIE network references an internal database to retrieve subscriber information. The HSS is a database of user-related and subscription-related information. The HSS database is used for e.g., mobility management, call and session establishment support, user authentication and access authorization. The user-related and subscription-related information may include for instance a LTE network identifier (International Mobile Subscriber Identity (IMSI)), data service agreement information (e.g., billing and accounting information), information relating to other network capabilities. In one variant, the database identifies one or more networks configured to provide voice service, and the subscriber identity within the identified voice service networks. For example, in this scenario, the voice service information includes: an indication that the UE supports CDMA 1X capabilities, and a Mobile Identification Number (MIN).

In alternate embodiments, the LTE network may determine device-specific information to determine if the UE has hybrid capabilities. For example, the International Mobile Equipment Identity (IMEI) information and/or manufacturer information can be used by the network to ascertain if the UE is capable of hybrid operation. In some cases, an Original Equipment Manufacturer (OEM) (such as the Assignee hereof) may only manufacture hybrid-capable devices. In other implementations, the OEM information may refer to specific models (and versions, etc.) which are known to support (or not support) hybrid operation.

In certain variants, the device specific information may be derived from the International Mobile Equipment Identity (IMEI) information. OEM information may be used to determine if the UE is configured for hybrid operation. For example, with certain OEMs, the device model and/or version can be used to quickly determine the UE's hardware and its enabled capabilities.

In a similar alternate embodiment, the HSS may reserve an explicit service class for hybrid type user devices. For example, the HSS may reserve a QoS (Quality of Service) Class Identifier (QCI) for hybrid type devices. As typically used, the QCI is a value that indicates a set of known transport characteristics (e.g., guaranteed bit rate, priority, packet delay budget, packet error loss rate). The reserved QCI has no such value, but may be used instead to indicate client device type (rather than a requested transport requirement). For example, UEs requesting a reserved QCI service (there are a total of ten (10) QCIs, of which nine (9) are currently defined) are identified as hybrid devices. Moreover, QCI management may be handled with Policy Charging Rules Function (PCRF) software that dynamically manages policy rules in a multimedia network dynamically.

At step 404, the MME (of the LTE network) determines the CDMA 1X paging schedule for the UE. In one embodiment, the client device information is provided to the Mobility Management Entity (MME) from the HSS or PCRF. The MME is the network entity responsible for idle mode UE tracking, paging procedures, and retransmissions. During operation, the MME is involved in radio bearer activation/deactivation processes, and is also responsible for choosing the Serving Gateway (SGW) for a UE at initial access and handovers involving Core Network (CN) node relocation. More generally, the MME provides the control plane function for mobility between LTE and 2G/3G access networks.

Thereafter, the MME calculates the CDMA 1X paging cycle based on the UE's MIN. Specifically, the UE calculates its CDMA 1X paging slot and the Slot Cycle Index (SCI), as a function of the UE's Mobile Identification Number (MIN).

In alternate embodiments, the UE device may explicitly provide its CDMA 1X paging schedule to the LTE MME directly. For example, the UE may provide e.g., a paging slot, and Slot Cycle Index (SCI).

At step 406, the MME provides the CDMA 1X paging schedule to the network of LTE eNBs, such that each LTE eNB can identify exact times where the UE will tune away from the LTE network. While the LTE eNBs are not attuned to the CDMA 1X network, the LTE eNBs can calculate CDMA 1X network time (based on Global Positioning System (GPS) data), and thus determine when the UE is being paged on the CDMA 1X network.

At step 408, for each paging cycle, the eNB suspends or "freezes" the state of the UE-eNB connection during scheduled tune away events. Artisans of ordinary skill in the related arts will readily appreciate that the suspended or frozen "state" does not necessarily require the eNB or UE to suspend their activity. In various embodiments, the eNB may continue processing and buffering data for the UE and similarly the UE may actively attempt to decode paging channel messages on another network. Instead, during suspended operation, the eNB halts data service to the UE. As previously described, in some embodiments, the eNB will buffer any data for the UE during suspended operation; in alternate embodiments, the eNB will discard data for the UE during suspended operation. Combinations of the foregoing may also be employed based on operational (e.g., available network or UE resources) or other considerations.

The eNB expects the UE to return to the network within a relatively short amount of time. Generally, the UE should tune away long enough to decode the paging channel, and possibly perform a few measurements. Accordingly, in one embodiment, the eNB assumes that the UE returns to service after a comparatively short interval. For example, the eNB may set a short timer for a tune away duration; once the timer expires, the device is assumed to have returned. Automatic resumption of service is both simple to implement, and does not require additional network signaling overhead; however, in the event the UE is tuned away for longer periods of time (e.g., to place a call, etc.), the resumed resources will be wasted.

Thus, in alternate embodiments, the eNB requires activity from the UE before reinstating the UE to active status. In one such variant, the eNB can use uplink control channel transmissions to detect when the device has tuned back (i.e., the UE will begin transmitting reporting data once the UE has returned). In some variants, the eNB will start a timer whenever the device tunes away. If the device returns before the timer expires, then the eNB will restore operation. If the device does not return in a reasonable (e.g., specified) time, the eNB will release the resources assigned to the UE and revert the UE to idle state.

Referring back to FIG. 4, the eNB provisions service to the UE normally for times other than the determined CDMA 1X tune away periods (step 410).

Apparatus—

Figure 5:
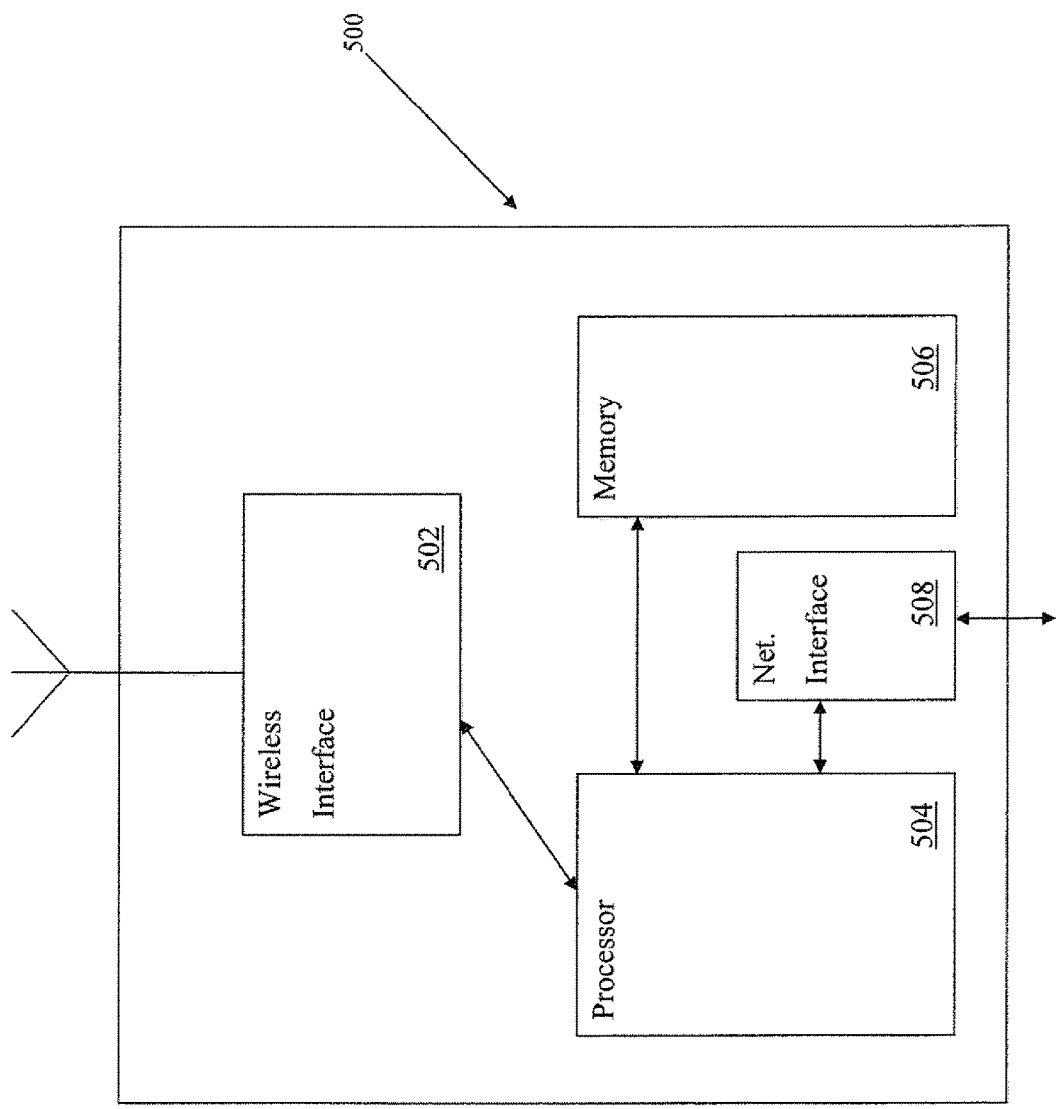
FIG. 5 is a functional block diagram of an exemplary embodiment of a wireless network apparatus useful for implementing various aspects of the present disclosure.

FIG. 5 illustrates one exemplary embodiment of a network entity 500 configured in accordance with the present disclosure. The network entity may be a stand-alone entity, or be incorporated with other network entities (e.g., a base station, a base station controller, a radio access network controller, etc.). In one implementation, the network entity includes a Long Term Evolution (LTE) Mobility Management Entity. In alternate configurations, the network entity includes a LTE evolved Node B (eNB).

As shown in FIG. 5, the network entity 500 generally includes a wireless (e.g., cellular) interface 502 for interfacing with cellular devices, a processor 504, and a non-transitory computer readable storage apparatus 506. The cellular interface is shown as a wireless cellular interface configured for communication with one or more mobile devices, although other configurations and functionalities may be substituted. For example, in alternate embodiments, the cellular interface may be a wireline communication to a base station, where the base station is in communication with the mobile device.

The cellular interface 502 of the apparatus 500 shown in FIG. 5 includes, at a high level, one or more radio transceiver circuits configured to transmit and receive data via radio frequency transmissions (RF). Common embodiments of a radio transceiver generally include a modem processor, and one or more antennas. In one exemplary embodiment, the radio transceiver is configured in accordance with Long Term Evolution (LTE) radio access technologies. It is recognized that various other implementations of the features described herein may be configured for other cellular and/or wireless standards. Common examples of such technologies include: GSM, GPRS, EDGE, WCDMA, CDMA2000, CDMA 1X, CDMA 1X-EVDO, LTE-A, etc. and various combinations thereof.

The processor 504 includes one or more processors (or multi-core processor(s)). Additionally, the processor is coupled to processing memory and/or the storage apparatus. Common implementations of the processing subsystem are implemented within signal processors, general processors, network processors, field programmable gate arrays (FPGAs), digital signal processors (DSPs), and any combination of the foregoing. Typical implementations of memory and storage apparatus include Random Access Memory (RAM) and variations thereof (Dynamic RAM, Static RAM, Synchronous RAM, etc.), Flash memory, and Hard Disk Drives (HDD). Moreover, it is further appreciated that one or more memory apparatus may further be configured in various redundancy schemes (e.g., Redundant Arrays of Inexpensive Drives (RAID)), etc.

In one exemplary embodiment, the network entity 500 is further coupled to a wired network infrastructure via a network interface 508. The network interface is generally adapted for use with Ethernet networks, although other suitable network variations include Synchronous Optical Networking (SONET), Asynchronous Transfer Mode (ATM), MoCA, etc. Various forms of physical interface are widely used within the related arts, including for example Ethernet cable (e.g., CAT5), coaxial, fiber optics, etc.

The non-transitory computer readable storage apparatus 506 includes a software program embodied as a series of instructions. These instructions can be executed by the processor to implement various software routines.

The apparatus includes software routines useful for calculating one or more paging schedules of another network. For example, in one exemplary embodiment, the CDMA 1X paging cycle based on a UE's Mobile Identification Number (MIN). In alternate embodiments, the software routines may receive paging information directly from one or more client devices, For example, a UE may provide e.g., a paging slot, and Slot Cycle Index (SCI).

The paging schedules for one or more client devices are used to avoid loss of service while the client device is tuned away from the apparatus. In particular, for each paging cycle, the apparatus suspends or "freezes" the state of the client device. Suspension may require the additional steps of buffering data and/or control information targeted to the client device.

Various other instructions embodied within the network apparatus may be useful for efficient resumption of operation. For instance, in some embodiments, the apparatus includes a series of timers which can be configured to resume client device operation on expiration. In other embodiments, the series of timers can be configured to terminate client device operation on expiration. In yet other embodiments, the apparatus may be configured to resume/terminate client device operation based on new activity received from the client device. For instance, the apparatus may monitor for uplink control channel transmissions; responsive to seeing client device activity, the apparatus may resume operation. Various other schemes will be appreciated by those of ordinary skill in the related arts, given the present disclosure.

It will be recognized that while certain features of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features as applied to various embodiments, it will be understood that various omissions, substitutions, and changes in the form and details of the device or process illustrated may be made by those skilled in the art. The above detailed description is in no way meant to be limiting, but rather should be taken as illustrative of the general principles of the described subject matter.

What is claimed is:

1. A network apparatus configured to operate in a Long Term Evolution (LTE) network, the network apparatus comprising:
    a processor;
    a wireless interface communicatively coupled with the processor; and
    a non-transitory computer readable storage device communicatively coupled with the processor and storing instructions that, when executed by the processor, cause the network apparatus to:
        determine whether a client device, which is in communication with the network apparatus via the wireless interface, is capable of hybrid operation on at least two distinct wireless networks, which operate using different radio access technologies (RATs), wherein:
            one of the at least two distinct wireless networks includes a Code Division Multiple Access 2000 (CDMA2000) wireless network from which the client device monitors pages by conducting tune-away events, the LTE network and the CDMA2000 wireless network operate independently, and the network apparatus is unaware of the client device's connections to the CDMA2000 wireless network, and determination is based at least in part on a client identity of the client device, the client identity including at least one of:

(a) user-related information and subscription-related information corresponding to the client device, wherein at least one of user-related information and the subscription-related information is available from a Home Subscriber Server (HSS) belonging to the LTE network, or (b) device-specific information comprising at least one of an International Mobile Equipment Identity (IMEI), a media access control (MAC address), or original equipment manufacturer (OEM) information specific to the client device; and when the client device is determined to be capable of hybrid operation:

identify a CDMA2000 wireless network with which the client device can communicate;

determine at least one scheduled tune-away event to be conducted by the client device to monitor pages from the CDMA2000 wireless network with which the client device can communicate, wherein the at least one scheduled tune-away event is determined based at least in part on an identifier of the client device and a schedule of tune-away events that is provided to the network apparatus by a mobile management entity (MME) of the LTE network; and during the at least one scheduled tune-away event, place an operational aspect of the client device, the operational aspect being associated with scheduling of network resources in the LTE network, in a suspended state in order to avoid loss of data from the LTE network, wherein the at least one scheduled tune-away event comprises the client device tuning away from the LTE network to the CDMA2000 wireless network.

2. The network apparatus of claim 1, wherein the identifier of the client device comprises a Mobile Identification Number (MIN).

3. The network apparatus of claim 1, wherein the suspended state of the client device includes one or more of:
halting data service to the client device, or
storing one or more software contexts associated with the suspended state of the client device.

4. The network apparatus of claim 1, wherein:
the suspended state is maintained for a set period of time, and
after expiration of the set period of time, the network apparatus returns the operational aspect of the client device to a normal state of operation.

5. The network apparatus of claim 1, wherein the suspended state is maintained until a prescribed message or communication is received from the client device.

6. The network apparatus of claim 1, wherein the determination as to whether the client device is capable of hybrid operation is further based in part on receipt from the client device of a Quality of Service (QoS) Class Identifier (QCI) reserved by a Home Subscriber Server (HSS) of the LTE network for identification of hybrid type client devices.

7. The network apparatus of claim 1, wherein the MME determines the schedule of tune-away events based at least in part on communication of the CDMA2000 wireless network paging schedule provided by the client device.

8. The network apparatus of claim 7, wherein the communication of the CDMA2000 wireless network paging schedule comprises a paging slot and a Slot Cycle Index (SCI).

9. The network apparatus of claim 1, wherein the OEM information comprises one or more of: a hardware model number or a version number for the client device.

10. The network apparatus of claim 1, wherein the OEM information comprises a software token or a certificate issued by the OEM of the client device.

11. A method for scheduling by a network apparatus of a Long Term Evolution (LTE) network based on client device identity, the method comprising:

by the network apparatus:

determining whether a client device, which is in communication with the network apparatus via a wireless interface, is capable of hybrid operation on at least two distinct wireless networks, which operate using different radio access technologies (RATs), wherein:
one of the at least two distinct wireless networks includes a Code Division Multiple Access 2000 (CDMA2000) wireless network from which the client device monitors pages by conducting tune-away events, the LTE network and the CDMA2000 wireless network operate independently, and the network apparatus is unaware of the client device's connections to the CDMA2000 wireless network, and determination is based at least in part on the client identity of the client device, the client identity including at least one of:

(a) user-related information and subscription-related information corresponding to the client device, wherein at least one of user-related information and the subscription-related information is available from a Home Subscriber Server (HSS) belonging to the LTE network, or (b) an device-specific information comprising at least one of an International Mobile Equipment Identity (IMEI), a media access control (MAC address), or original equipment manufacturer (OEM) information specific to the client device; and when the client device is determined to be capable of hybrid operation:

receiving, from a mobile management entity (MME) of the wireless network, a paging schedule of a second wireless network for the client device, the paging scheduled being based on an identifier of the client device;

determining, based at least in part on the received paging schedule of the second wireless network and the identifier of the client device, a schedule for one or more tune-away events of the client device from the wireless network to the second wireless network, wherein the one or more tune-away events enable the client device to determine whether the client device is being paged by the second wireless network; and during the one or more tune-away events, suspending at least one aspect of an operation of the client device associated with scheduling of network resources in the wireless network in order to avoid loss of data from the wireless network.

12. The method of claim 11, wherein the determination as to whether the client device is capable of hybrid operation is further based in part on an identification of a user or a subscriber identity associated with the client device.

13. The method of claim 11, wherein the second wireless network comprises a Code Division Multiple Access 2000 network, and the identifier of the client device comprises a Mobile Identification Number (MIN) associated with the client device.

14. The method of claim 13, wherein the network apparatus determines a paging slot and a slot cycle index based on the MIN associated with the client device.

15. The method of claim 11, wherein the determination as to whether the client device is capable of hybrid operation is further based in part on receipt from the client device of a Quality of Service (QoS) Class Identifier (QCI) reserved by a Home Subscriber Server (HSS) of the wireless network for identification of hybrid type client devices.

16. The method of claim 11, wherein the OEM information comprises one or more of: a hardware model number or a version number for the client device.

17. The method of claim 11, wherein the OEM information comprises a software token or a certificate issued by the OEM of the client device.

18. A non-transitory computer readable medium storing computer-readable instructions thereon that, when executed by a host device of a Long Term Evolution (LTE) network, cause the host device to:
determine whether a client device that is in communication with the host device via a wireless interface is capable of hybrid operation on at least two distinct wireless networks that operate using different wireless technologies, wherein:
one of the at least two distinct wireless networks includes a Code Division Multiple Access 2000 (CDMA2000) wireless network from which the client device monitors pages by conducting tune-away events, the LTE network and the CDMA2000 wireless network operate independently, and the host device is unaware of the client device's connections to the CDMA2000 wireless network, and
determination is based at least in part on a client identity of the client device, the client identity including at least one of:
(a) user-related information and subscription-related information corresponding to the client device, wherein at least one of user-related information and the subscription-related information is available from a Home Subscriber Server (HSS) belonging to the LTE network, or
(b) device-specific information comprising at least one of an International Mobile Equipment Identity (IMEI), a media access control (MAC address), or original equipment manufacturer (OEM) information specific to the client device; and
when the client device is determined to be capable of hybrid operation:
identify at least one other wireless technology that the client device can utilize;
determine at least one scheduled tune-away event to be conducted by the client device to monitor pages from a circuit-switched network with which the client device can communicate, wherein the at least one scheduled tune-away event is determined based at least in part on an identifier of the client device and a schedule of tune-away events that is provided to the host device by a mobile management entity (MME) of a packet-switched network; and
during the at least one scheduled tune-away event, suspend at least one aspect of operation between the client device and the host device associated with scheduling of network resources in the packet-switched network in order to avoid loss of data from the packet-switched network, wherein the at least one scheduled tune-away event comprises the client device tuning away from the packet-switched network to the circuit-switched network.

19. The non-transitory computer readable medium of claim 18, wherein the determination as to whether the client device is capable of hybrid operation is further based in part on receipt from the client device of a Quality of Service (QoS) Class Identifier (QCI) reserved by a Home Subscriber Server (HSS) of the packet-switched network for identification of hybrid type client devices.

20. The non-transitory computer readable medium of claim 18, wherein the OEM information comprises one or more of: a hardware model number or a version number for the client device, or a software token or a certificate issued by the OEM of the client device.

* * * * *